United States Patent [19]

Brown et al.

[11] Patent Number: 4,785,549

[45] Date of Patent: Nov. 22, 1988

[54] METHOD AND APPARATUS FOR PRODUCING AND EDITING MICROFICHE MASTERS

[76] Inventors: Albert M. B. Brown, 124 Belmont Road, Kenwick, Western Australia, Australia, 6107; Arthur R. Ellis, 10 Cooba Place, Duncraig, Western Australia, Australia, 6023

[21] Appl. No.: 1,659

[22] PCT Filed: Mar. 21, 1986

[86] PCT No.: PCT/AU86/00072

§ 371 Date: Nov. 19, 1986

§ 102(e) Date: Nov. 19, 1986

[87] PCT Pub. No.: WO86/05600

PCT Pub. Date: Sep. 25, 1986

[30] Foreign Application Priority Data

Mar. 21, 1985 [AU] Australia .............................. PG9836
Sep. 4, 1985 [AU] Australia .............................. PH2275

[51] Int. Cl.[4] ........................ B41B 1/00; G03B 27/02

[52] U.S. Cl. ........................................ 33/623; 33/615

[58] Field of Search ................. 33/1 G, 613, 614, 615, 33/616, 619, 620, 623, 645, 562; 355/75, 79, 132

[56] References Cited

U.S. PATENT DOCUMENTS

| | | | |
|---|---|---|---|
| 2,099,364 | 11/1937 | Hunter | 33/623 |
| 2,418,754 | 4/1947 | Brunet | 33/615 |
| 2,499,100 | 2/1950 | Kessler, Jr. | 355/132 |
| 2,711,031 | 6/1955 | Kessler, Jr. | 33/623 |
| 2,983,049 | 5/1961 | Andrisani | 33/623 |
| 3,070,893 | 1/1963 | Sures | 33/615 |
| 3,170,245 | 2/1965 | Updegraff | 33/623 |
| 3,287,814 | 11/1966 | Littmann | 33/613 |
| 3,798,782 | 3/1974 | Lindahl | 33/623 |
| 3,935,583 | 1/1976 | Spence-Bate | 355/79 |
| 4,231,659 | 11/1980 | Logan | 355/132 |
| 4,448,520 | 5/1984 | Achtman et al. | 355/75 |

*Primary Examiner*—Harry N. Haroian
*Attorney, Agent, or Firm*—Reising, Ethington, Barnard, Perry & Milton

[57] ABSTRACT

Method and apparatus for the production and editing of microfiche masters in which there is established on a transparent adhesive backing sheet (16) a plurality of reduced size exposed film frames each located in a particular location and orientation, and where one of the film frames on the adhesive backing (16) has to be replaced with an edited substitute film frame (62), removing the film frame (62) to be replaced from the adhesive backing sheet (16), and placing an apertured device (36) over the place from which the film frame (62) was removed so as to provide a guide aperture (40) for placement of the substitute film frame (62) in the same location as the removed film frame (62).

9 Claims, 3 Drawing Sheets

METHOD AND APPARATUS FOR PRODUCING AND EDITING MICROFICHE MASTERS

DESCRIPTION

The present invention relates to a method and apparatus for producing and editing microfiche masters.

FIELD OF THE INVENTION

Microfiche masters typically comprise a plurality of film frames of reduced size mounted in an array by any suitable means in such manner that reproductions of the master can be made for dissemination to users. However, in some circumstances frames in a particular microfiche master may require editing so that information provided to users is current. This applies particularly to maps of urban areas showing the location of public utilities such as drains and sewers, and power and gas supply conduits. These public utilities are constantly being modified in a typical urban area and thus the master maps require amendment to keep them up to date. The information from the master maps is frequently stored on microfiche so as to reduce handling of the masters and to facilitate reproduction of the information. In the past there has not been available a convenient means for editing microfiche masters.

SUMMARY OF THE INVENTION

In accordance with one aspect of the present invention there is provided a method for the production and editing of microfiche masters which comprises firstly establishing on a transparent adhesive backing sheet a plurality of reduced size exposed film frames each located in a particular location and orientation, identifying the need to replace one of the film frames on the adhesive backing with an edited substitute film frame, removing the film frame to be replaced from the adhesive backing sheet, and placing an apertured device over the place from which the film frame was removed so as to provide a guide for placement of the substitute film frame in the same location as the removed film frame.

In accordance with another aspect of the present invention there is provided a template apparatus for use with production and editing of microfiche masters, which comprises a base plate arranged to receive and retain a microfiche master to be edited in a precise location, and a template means containing an aperture arranged to fit over an area of the master so as to provide a guide for placement of an exposed film frame.

BRIEF DESCRIPTION OF THE DRAWINGS

The present invention will now be described, by way of example, with reference to the accompanying drawings, in which.

DESCRIPTION OF THE INVENTION

In the production of a microfiche master, original source documents are typically microfilmed at a predetermined reduction factor. The exposed frames are then cut out from the microfilm by any suitable means. The cut out exposed frames may then be placed on a clear adhesive base sheet with the emulsion side of the frame uppermost. The clear adhesive base sheet may conveniently be formed of a plastics material. Essentially any material which will adhere to the exposed frames, is suitable. An especially suitable product is sold by Molex Microfilm Products, Inc. under the name "Molex-Fiche". Molex-fiche is a clear flexible plastics material which has been surface treated to enable exposed film frames to adhere to it.

Figure 1:
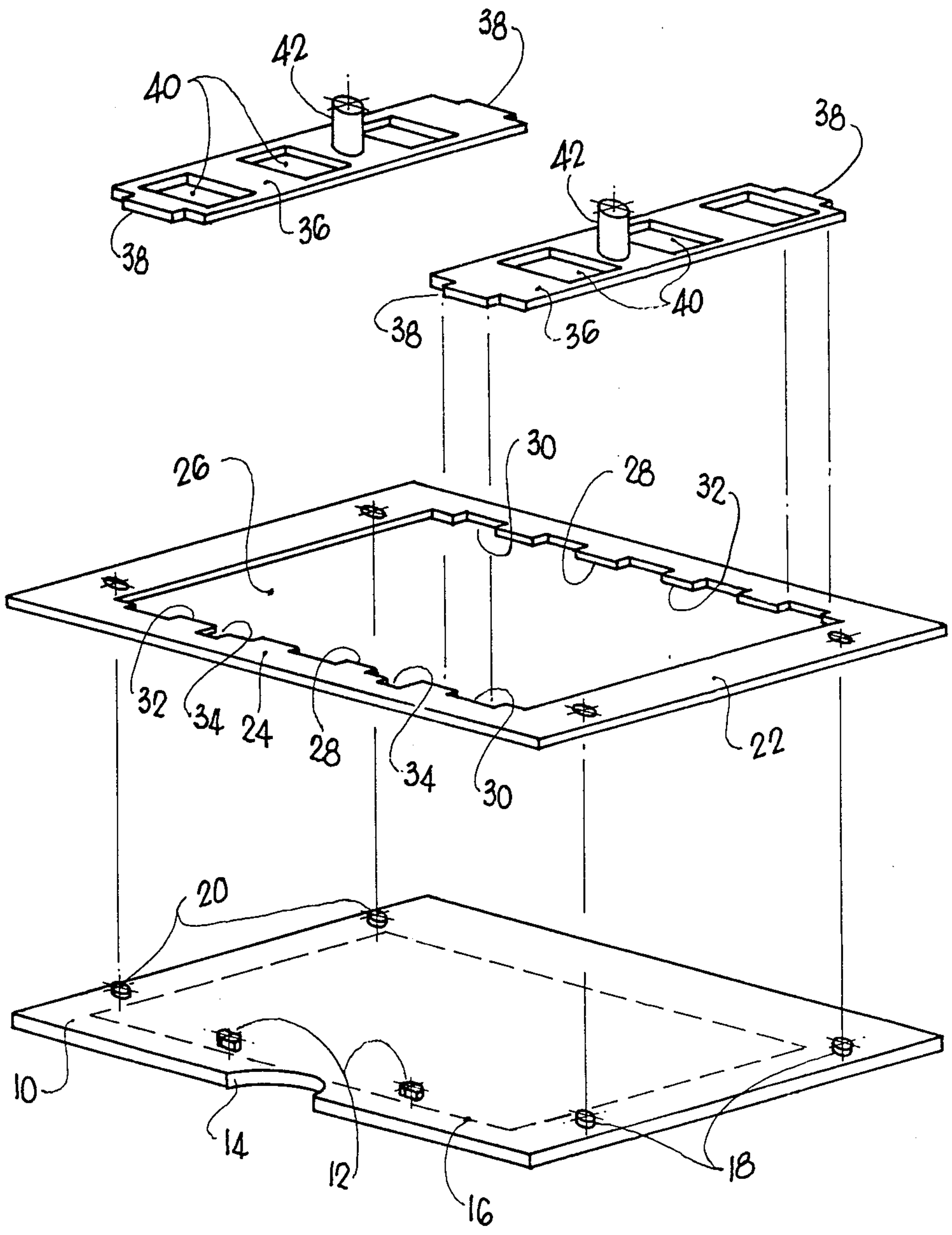
FIG. 1 is an exploded, perspective view of a template apparatus in accordance with the present invention.

The exposed frame may be placed on the clear adhesive base sheet by any convenient means such as by use of the template apparatus of FIG. 1. The apparatus of FIG. 1 comprises a rectangular flat base plate 10 having mounted thereon a first pair of upstanding locating pins 12 adjacent one longitudinal edge of the base plate 10. At a point between the pins 12 the adjacent edge of the base plate 10 is formed with an arcuate recess 14. The pins 12 are used to locate the clear adhesive base sheet, the location of which is shown by the dotted line 16. The base sheet has formed in it a pair of apertures corresponding to the pins 12 such that the apertures are placed over and engaged with respective pins 12 to locate positively the base sheet in a required location. The base plate 10 also has mounted on it second and third pairs of upstanding locating pins 18 and 20. The second and third pairs of pins 18 and 20 are located adjacent corresponding lateral edges of the base plate 10 externally of the intended location of the base sheet as shown by the line 16.

The pairs of pins 18 and 20 are arranged to engage with corresponding apertures in a locating plate 22. The locating plate 22 comprises an endless peripheral portion 24 surrounding a large central aperture 26. After the base sheet has been placed on the base plate 10, the locating plate 22 is placed over the base plate with the pins 18 and 20 in engagement with the corresponding apertures of the locating plate 22. Along two opposed internal margins 28 the peripheral portion 24 is castellated such as to have alternating recesses 30 and projections 32.

Further, along one of the margins 28 there is formed in two of the recesses 30 additional recesses 34 arranged to enable the locating plate 22 to clear the pins 12. Still further, an elongated aperture guide template 36 is arranged to be placed lengthwise between the opposed margins 28. The template 36 comprises ends with respective projections 38 arranged to fit snugly into recesses 30 of the margins 28. The template 36 also contains a plurality of spaced rectangular apertures 40. Also, a handle 42 is mounted on the template 36 to enable it to be picked up and moved about readily. As shown in FIG. 1, the apertures 40 in the template 36 are disposed asymmetrically such that the template 36 can be reversed in its orientation to enable the apertures 40 to cover different areas of the base sheet whilst being engaged with the same pair of recesses 30. The apparatus of FIG. 1 may be used to mount exposed film frames on an adhesive backing sheet by mounting the template 36 between opposed recesses 30 and placing individual film frames in spaces defined by the apertures 40.

If it is desired for the film frames to be close together in a row extending between the margins 28 then this can be achieved by reversing the orientation of the template 36 and placing a film frame in a second space defined by the aperture 40 which is closest to the first space. Once a row of frames has been placed in position, the template 36 can be moved to the adjacent postion in engagement with the next pair of recesses 30 and the process repeated.

Figure 3:
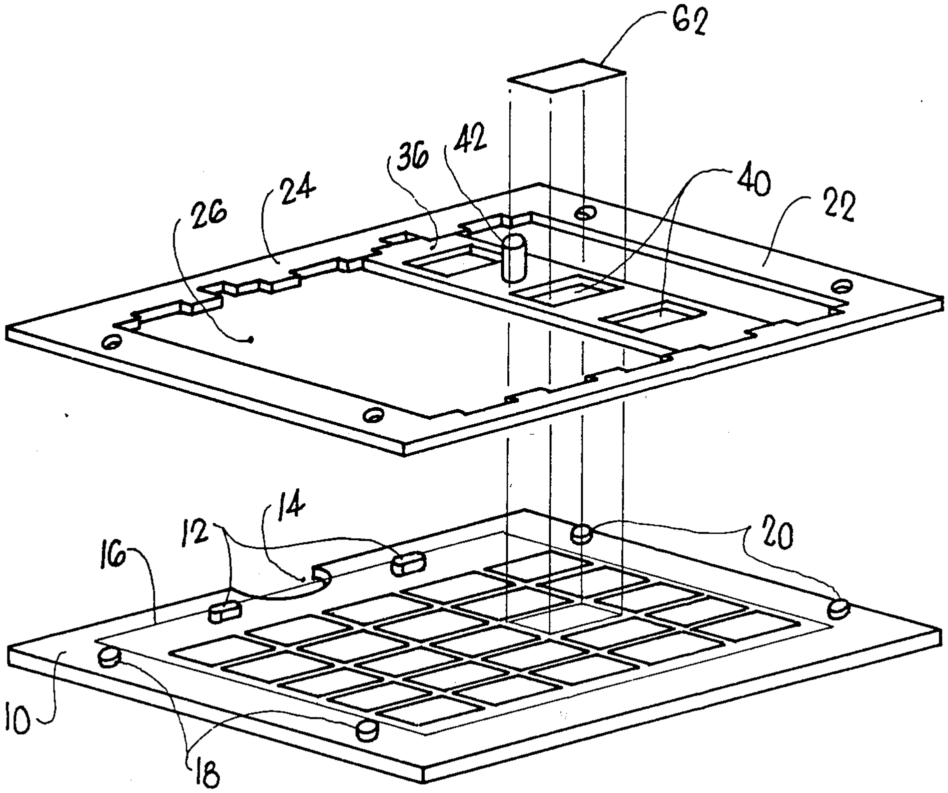
FIG. 3 is a view, similar to FIG. 1, showing the template apparatus in use in editing a microfiche master.

When the base sheet has been filled with exposed frames or when all the required frames have been adhered to the base sheet, the base sheet which is now a master microfiche as shown in FIG. 3, can be removed after lifting the template 36 and locating plate 22 from the base plate 10. The template 36 can be lifted by means of the handle 42 and the locating plate 22 can be lifted by placing a finger in the recess 14 and engaging it with the locating plate 22. The removed master microfiche can then be put in an envelope and placed in a secure location until required for use. In known manner reproductions can be made from the master microfiche as required for dissemination to users of the information contained on the master microfiche.

However, if the information contained on one of the exposed frames becomes out of date or otherwise not accurate, then that particular frame can be readily replaced by the apparatus of the present invention. Firstly, an amended source document is photographed on a reduced scale on a microfilm. The exposed frames are then separated from the developed microfilm by any convenient means such as by punching.

Figure 2:
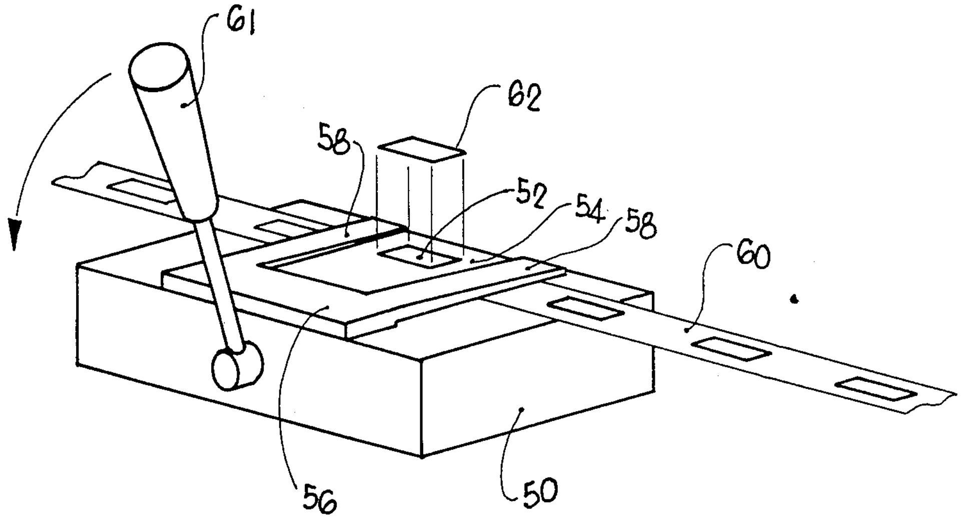
FIG. 2 is an upper perspective view of a punch which can be used in the method of the present invention.

A punch construction which is useful in the present invention is shown in FIG. 2. The punch shown in FIG. 2 comprises a base 50 which contains a rectangular aperture (not shown) of a size corresponding to the size of an exposed film frame to be separated from a microfilm. The punch also comprises an aperture 52 in an upper retaining plate 54 which is connected to the base 50 by mans of a relatively thick side portion 56. A pair of arms 58 projecting away from the side 56 on respective sides of the plate 54. The plate 54 and the arms 58 are spaced from the base 50 by a small gap arranged to receive a strip of microfilm 60 or an aperture card.

The arms 58 are located on opposite sides of the aperture 52. The base 50 contains a snugly fitted rectangular cutter means (not shown) within the aperture therein. The cutter means is operatively connected to a handle 61.

When the handle 61 is pivoted in the direction shown by the arrow in FIG. 2 the cutter means rises in the aperture in the base 50 and then passes into the aperture 52. This action cuts out an exposed film frame 62 from a received strip of microfilm 60. The exposed film frame 62 is then used to replace a film frame removed from a master microfiche. As shown in FIG. 3, this may conveniently be done using the apparatus of FIG. 1 by placing the master microfiche to be edited in the apparatus by locating the base sheet on the pair of pins 12 and then placing the locating plate 22 over the base plate 10 on the pairs of pins 18 and 20.

The film frame to be replaced can be removed manually from the master microfiche before or after placement in the apparatus. Then the template 36 is placed in the locating plate 22 as shown in FIG. 3 to place an aperture 40 at the location from which the frame was removed. The new frame 62 with modified information can then be placed into the appropriate aperture 40 so that the master is once again complete.

The use of the apparatus of the present invention removes the need for tedious hand to eye co-ordination in placement of the substitute film frames.

The frames on the master can be arranged in a closely adjacent rectangular array as shown in FIG. 3 or otherwise on the transparent film base. The master microfiche is reproduced with the emulsion side of the duplicate in contact with the emulsion sides of the master frames so that loss of resolution from undercutting of light is minimized.

The clear film base is typically a clear plastics material which is arranged to have other plastics material adhere to it in a releasable manner. Since only modified source documents have to be replaced in the method of the present invention handling of valuable source documents is minimised. Further, with the method of the present invention a plurality of images can be placed on a single microfiche. With map images the film frames can be placed almost contiguous to one another without any borders so that a user can readily obtain information from more than one frame at a time.

Modifications and variations such as would be apparent to a skilled addressee are deemed within the scope of the present invention.

We claim:

1. A template apparatus for use with production and editing microfiche masters which comprises a base plate adapted for receiving and retaining a microfiche master to be edited in a precise location, a locating plate including a peripheral portion surrounding an aperture said peripheral portion comprises opposed inner margins having alternating recesses and projections for attachment to said base plate at a precise location, and a moveable template having ends being shaped for interlocking with at least one of said recesses and projections, said template containing at least one aperture arranged to fit over an area of the master so as to provide an adjustable guide for placement of an exposed film frame.

2. A template apparatus according to claim 1 wherein the base plate contains a plurality of upstanding pins arranged to engage with respective apertures in a base sheet so as to locate precisely the base sheet.

3. A template apparatus according to claim 2, wherein said ends of said moveable template have identical shapes so that said template can be reversed in its orientation relative to said locating plate such that said at least one aperture can cover a different area on the base sheet while being interlocked with the same opposed recesses.

4. A template apparatus according to claim 1 or 2, wherein said locating plate is arranged precisely on said base plate relative to said base sheet by means of a plurality of pins engaged with corresponding apertures.

5. A method for the editing of microfiche masters comprises firstly establishing on a transparent adhesive backing sheet a plurality of reduced size exposed film frames each located in a particular location and orientation, identifying the need to replace one of the film frames on the adhesive backing with an edited substitute film frame, removing the film frame to be replaced from the adhesive backing sheet, placing the microfiche master to be edited in a precisely defined location on a base plate, fixing a locating plate having a peripheral portion surrounding an aperture which peripheral portion has opposed inner margins containing opposed recesses and projections on the base plate at a precise location relative to the backing sheet, positioning a moveable template having one or more film frame size apertures and ends shaped so as to co-operate with the opposed recesses and projections within the locating plate by interlocking the ends of the template with the opposed recesses and projections of the locating plate so as to place an aperture at the precise location from which the film frame has been removed so as to provide an adjustable guide for placement of the substitute film frame.

6. A method according to claim 1, wherein the master microfiche is initially created by placing a clear adhesive base sheet on a base plate in a precise location and placing the movable template over the base sheet in precisely defined locations and orientation to guide the placement of the exposed film frames on the base sheet.

7. A method according to claim 6, wherein the locating plate is placed on the base plate at a precise location relative to the backing sheet and the movable template containing one or more film frame size apertures co-operates with the locating plate so as to place an aperture at the precise location at which a film frame is to be placed and then placing a film frame in the aperture.

8. A method for the production of microfiche masters according to claim 1, wherein the ends of the movable template are of identical shape for reversing the template in its orientation relative to the locating plate such that one or more film frame size aperture can cover different areas on the base sheet while being interlocked with the same opposed recesses.

9. A method for the production of microfiche masters which comprises firstly placing or clear adhesive backing sheet in a precisely defined location on a base plate, fixing a locating plate having a peripheral portion surrounding a aperture which peripheral portion has opposed inner margins containing opposed recesses and projections on the base plate at the precise location relative to the backing sheet, positioning a moveable template having on or more film frame size apertures and ends shaped so as to co-operate with the opposed recesses and projections within the locating plate by interlocking the ends of the template with the opposed recesses and projections of the locating plate so as to place an aperture at the precise location at which an exposed film frame has to be placed and then placing a film frame on the backing sheet in the place defined by the said placed aperture.

* * * * *